United States Patent Office 2,922,780
Patented Jan. 26, 1960

2,922,780

MODIFYING BUTYL RUBBER BY HEATING WITH A C-NITROSO SECONDARY AROMATIC AMINE

John J. D'Amico and Harold M. Leeper, Charleston, and Ching C. Tung, Nitro, W. Va., assignors to Monsanto Chemical Company, St. Louis, Mo., a corporation of Delaware No Drawing. Application October 27, 1955
Serial No. 543,252

8 Claims. (Cl. 260—79.5)

The present invention relates to a process of improving the properties of Butyl rubber by the method and means as disclosed. More particularly, the invention relates to improvements in the heat processing of Butyl rubber, to the vulcanizing of such treated Butyl rubber and to the vulcanized Butyl rubber so produced.

Butyl rubber is the well recognized generic name applied to a variety of elastic copolymers of isobutylene and small quantities of diolefins. The diolefins are usually chosen to give a final product which has only a small percentage of the unsaturation of natural rubber (not more than 15% diolefin). Due to this low unsaturation, Butyl rubber is very stable but for this same reason it is difficult to vulcanize. The vulcanization reaction is not only sluggish but the vulcanizates lack the modulus, resilience and resistance to flow required for many uses. These characteristics in the past have limited the field of usefulness of Butyl rubber to a considerable extent.

An object of the present invention is to improve the properties of Butyl rubber vulcanizates by special treating agents. A particular object is to provide by these special treating agents a means to increase the modulus and otherwise improve the physical characteristics of the vulcanizate. A further object of the invention is to provide a process for simplifying and modifying the heat treatment of Butyl rubber as well as lower the torsional hysteresis of the vulcanizates. A further object is to provide a special group of chemical compounds which improve the properties of Butyl rubber when heated with the rubber. Such improvers of heat treatment, as will be shown in the examples that follow, are nitrosoamines.

More specifically, the preferred modifiers of Butyl rubber comprise derivatives of p-nitrosoaniline having one hydrogen atom and one organic substituent attached to the amino nitrogen atom. Examples of suitable organic substituents are alkyl groups containing one to and including twelve carbon atoms, phenyl groups and substituted alkyl groups. A carboalkoxy substituent is especially desirable. The nitrosoaniline may also contain nuclear substituents, as for example halogen or alkoxy. Compounds in which the organic substituent is attached to the ring as well as to nitrogen also proved active, as for example 1,2,3,4-tetrahydro-2,2,4-trimethyl-6-nitrosoquinoline. Some of these are new chemical compounds.

The preferred modifiers may be prepared by nitrosation of the corresponding N-substituted anilines in a manner conventional for the nitrosation of secondary aromatic amines. Reaction of the secondary amine with nitrous acid in the cold yields an N-nitroso compound which rearranges to a para-nitroso aniline under the influence of an excess of hydrochloric acid. In some cases it is more convenient to effect the nitrosation and rearrangement in one step by conducting the reaction in methanol solution in the presence of an excess of hydrogen chloride under anhydrous conditions. The procedure is described by Wyler et al. in U.S. Patent 2,046,356. Other suitable catalysts are $PCl_3$ and phosgene. Of course, the free nitrosoamine must be isolated from the hydrogen chloride salt by treatment with ammonium hydroxide or other base.

The physical properties of typical examples of the modifiers are set forth below:

|  | M.P., ° C. |
|---|---|
| 3-chloro-N-ethyl p-nitrosoaniline | 110–112 |
| 3-ethoxy N-ethyl p-nitrosoaniline | 120–122 |
| N-sec. Butyl p-nitrosoaniline | Oil |
| N-amyl p-nitrosoaniline | 66–67 |
| N-hexyl p-nitrosoaniline | 47–48 |
| N-heptyl p-nitrosoaniline | 73–74 |
| N-octyl p-nitrosoaniline | 48–49 |
| N-decyl p-nitrosoaniline | 47–48 |
| N-dodecyl p-nitrosoaniline | 54–55 |
| N-cyclohexyl p-nitrosoaniline | 94–95 |
| Methyl N-(p-nitrosophenyl)beta-alanine | 107–107.5 |
| N-(p-nitrosophenyl)glycine amide | 150–151 |
| 3-(p-nitrosoanilino)propionamide | 173–174 |
| 2-(p-nitrosoanilino)ethanol | 92–93 |

Although any order of incorporation of the various ingredients of the mix as commonly practiced in the art may be followed, the beneficial effect of the modifiers is enhanced if the rubber alone be treated with the preferred additive. This is accomplished most readily by mixing the raw Butyl rubber with from 0.3 to 1.0% by weight of nitrosoamine in a Banbury mill for about 10 minutes while maintaining the mix at a temperature of substantially 300° F. The mix so obtained is designated as "modified Butyl rubber." Thereupon carbon black is added in the normal manner and mixing continued for 10 minutes at about 300° F. The carbon black-modified Butyl rubber masterbatch is then dumped from the Banbury mill and compounding of the completed mix continued in normal manner on the differential rubber mills with no further heat treatment. In all cases in the results set forth below the same recipe or formula was followed and comprised the following:

|  | Parts |
|---|---|
| Butyl rubber | 100 |
| Modifier as shown | 0.5 |
| Carbon black | 50 |
| Zinc oxide | 5 |
| Tetramethyl thiuram disulfide | 1 |
| 2,2'-dithiobis benzothiazole | 1 |
| Sulfur | 2 |

Vulcanization was carried out by heating in a press for 45 minutes at a temperature of 144° C. (291° F.) Physical properties including modulus of elasticity at 300% elongation, tensile strength at break and percent elongation at break were all determined in the well known manner. The results obtained from the various examples of the inventions are as follows:

*Table I*

| Modifier | Modulus at 300% Elong. | Tensile at Break in lbs./in.² | Ult. Elong., Percent | Torsional Hysteresis |
|---|---|---|---|---|
| None | 1,080 | 2,770 | 630 | 0.383 |
| N-Methyl p-nitrosoaniline | 2,230 | 2,930 | 420 | |
| N-Ethyl p-nitrosoaniline | | 1,980 | 260 | 0.191 |
| 3-Chloro N-ethyl p-nitrosoaniline | | 2,110 | 250 | 0.190 |
| 3-Ethoxy N-ethyl p-nitrosoaniline | 2,410 | 3,130 | 410 | |
| N-Butyl p-nitrosoaniline | 2,440 | 2,720 | 350 | 0.151 |
| N-Isopropyl p-nitrosoaniline | 2,370 | 2,900 | 380 | 0.157 |
| N-sec. Butyl p-nitrosoaniline | 2,100 | 2,990 | 450 | 0.218 |
| N-Decyl p-nitrosoaniline | 2,140 | 3,040 | 450 | 0.190 |
| N-Heptyl p-nitrosoaniline | 1,850 | 2,940 | 480 | |
| N-Dodecyl p-nitrosoaniline | 1,960 | 3,080 | 480 | 0.182 |
| p-Nitroso diphenylamine | 1,710 | 2,610 | 560 | 0.296 |
| Methyl N-(p-nitrosophenyl)-beta-alanine | 2,800 | 3,140 | 390 | 0.170 |

The results show that by employing the class of compounds described in the manner set forth, Butyl rubber is modified in character so as to produce in a fully compounded stock after vulcanization different properties from those required for an inner tube compound. These properties increase the field of application for Butyl rubber.

While 0.5 part based on 100 parts of Butyl rubber is about optimum, the modifier concentration can vary. As low as 0.1 part exerts noticeable activity. Amounts higher than 0.5 part also modify Butyl rubber but are not necessarily more advantageous. Further tests were carried out which illustrate the effect of concentration. Raw Butyl rubber was mixed with N-propyl p-nitrosoaniline in a Banbury mill at 300° F. for ten minutes, carbon black added and then curatives added on a mill as described in connection with the foregoing tests. Physical properties of the vulcanizates obtained by heating in a press 45 minutes at 291° F. were as follows:

Table II

| Concentration of Modifier, Percent Based on Butyl | Modulus at 300% Elong. | Tensile at Break in lbs./in.² | Ult. Elong., Percent | Torsional Hysteresis |
|---|---|---|---|---|
| none | 1,350 | 2,880 | 570 | 0.402 |
| 0.1 | 1,480 | 2,920 | 580 | 0.389 |
| 0.3 | 1,930 | 2,980 | 450 | 0.164 |
| 0.5 | 2,080 | 3,070 | 440 | 0.183 |

In the case of methyl N-(p-nitrosophenyl)beta-alanine 1.0 part exerted slightly more modifying action than 0.5 part but 2.0 parts failed to increase the modulus further.

It is intended to cover all changes and modifications of the examples of the invention herein chosen for purposes of disclosure which do not constitute departures from the spirit and scope of the invention.

What is claimed is:

1. The process which comprises heating and milling at about 300° F. a mixture consisting of a rubbery copolymer of at least 85% isobutylene and a minor amount of a conjugated diene hydrocarbon and 0.3–2.0% of a p-nitrosoaniline containing at least three hydrogen atoms in the benzene ring the remaining substituent being selected from the group consisting of hydrogen, chloro and lower alkoxy, the amino group of which contains one hydrogen atom linked thereto and one radical selected from the group consisting of alkyl groups containing one to and including twelve carbon atoms, phenyl, carboalkoxy substituted lower alkyl groups and cyclohexyl, the conditions of heating being substantially as severe as Banbury mixing for ten minutes at 300° F.

2. The process which comprises heating and milling a mixture consisting of a rubbery copolymer of at least 85% isobutylene and a minor amount of a conjugated diene hydrocarbon and 0.3–1.0% of a p-nitroso secondary aniline containing one alkyl substituent in the amine group of one to twelve carbon atoms, the conditions of heating being substantially as severe as Banbury mixing for ten minutes at 300° F.

3. The process which comprises heating and milling a mixture consisting of a rubbery copolymer of at least 85% isobutylene and a minor amount of a conjugated diene hydrocarbon and 0.3–1.0% of N-isopropyl p-nitrosoaniline, the conditions of heating being substantially as severe as Banbury mixing for ten minutes at 300° F.

4. The process which comprises heating and milling a mixture consisting of a rubbery copolymer of at least 85% isobutylene and a minor amount of a conjugated diene hydrocarbon and 0.3–1.0% of N-decyl p-nitrosoaniline, the conditions of heating being substantially as severe as Banbury mixing for ten minutes at 300° F.

5. The process which comprises heating and milling a mixture consisting of a rubbery copolymer of at least 85% isobutylene and a minor amount of a conjugated diene hydrocarbon and 0.3–1.0% of N-butyl p-nitrosoaniline, the conditions of heating being substantially as severe as Banbury mixing for ten minutes at 300° F.

6. The process which comprises heating and milling a mixture consisting of a rubbery copolymer of at least 85% isobutylene and a minor amount of a conjugated diene hydrocarbon and 0.3–1.0% of methyl N-(p-nitrosophenyl) beta-alanine, the conditions of heating being substantially as severe as Banbury mixing for ten minutes at 300° F.

7. The process of claim 1 followed by the addition of carbon black, zinc oxide, accelerator and sulfur and vulcanizing.

8. The process of claim 1 followed by the addition of carbon black, zinc oxide, a thiuram disulfide accelerator and sulfur and vulcanizing.

References Cited in the file of this patent

UNITED STATES PATENTS

| 2,393,321 | Haworth | Jan. 22, 1946 |
| 2,526,504 | Rehner et al. | Oct. 17, 1950 |